United States Patent [19]
Sato

[11] 3,877,636
[45] Apr. 15, 1975

[54] AUTOMATIC STARTING DEVICE FOR PLANT

[75] Inventor: Yoshio Sato, Hitachi, Japan

[73] Assignee: Hitachi, Ltd., Tokyo, Japan

[22] Filed: Jan. 15, 1974

[21] Appl. No.: 433,502

[30] Foreign Application Priority Data
Jan. 16, 1973 Japan.................................. 48-6628
May 21, 1973 Japan.............................. 48-55643
July 9, 1973 Japan.............................. 48-76637

[52] U.S. Cl.................... 236/14; 122/448; 236/15 E
[51] Int. Cl............................................... F23n 1/08
[58] Field of Search............... 236/14, 15 E; 60/106; 122/448, 449

[56] References Cited
UNITED STATES PATENTS
3,284,615 11/1966 Yetter................................ 236/14 X
3,774,396 11/1973 Borsi................................. 236/14 X

*Primary Examiner*—Edward G. Favors
*Attorney, Agent, or Firm*—Craig & Antonelli

[57] ABSTRACT

A target value or desired value for a fluid temperature at the exit of a plant after $n$ samplings, is determined by an actual measurement of a fluid temperature at the exit of the plant as well as by a rate of temperature rise which has been set corresponding to said actual measurement. On the other hand, an enthalpy corresponding to a fluid temperature at the exit of the plant is determined, whereby the enthalpy after a predetermined lapse of time may be estimated by a variation rate obtained, and then an estimated fluid temperature at the exit of the plant corresponding to the estimated enthalpy is determined. The amount of fuel for plant is controlled, commensurate to the deviation from the target temperature, of the estimated temperature obtained by using an enthalpy.

12 Claims, 12 Drawing Figures

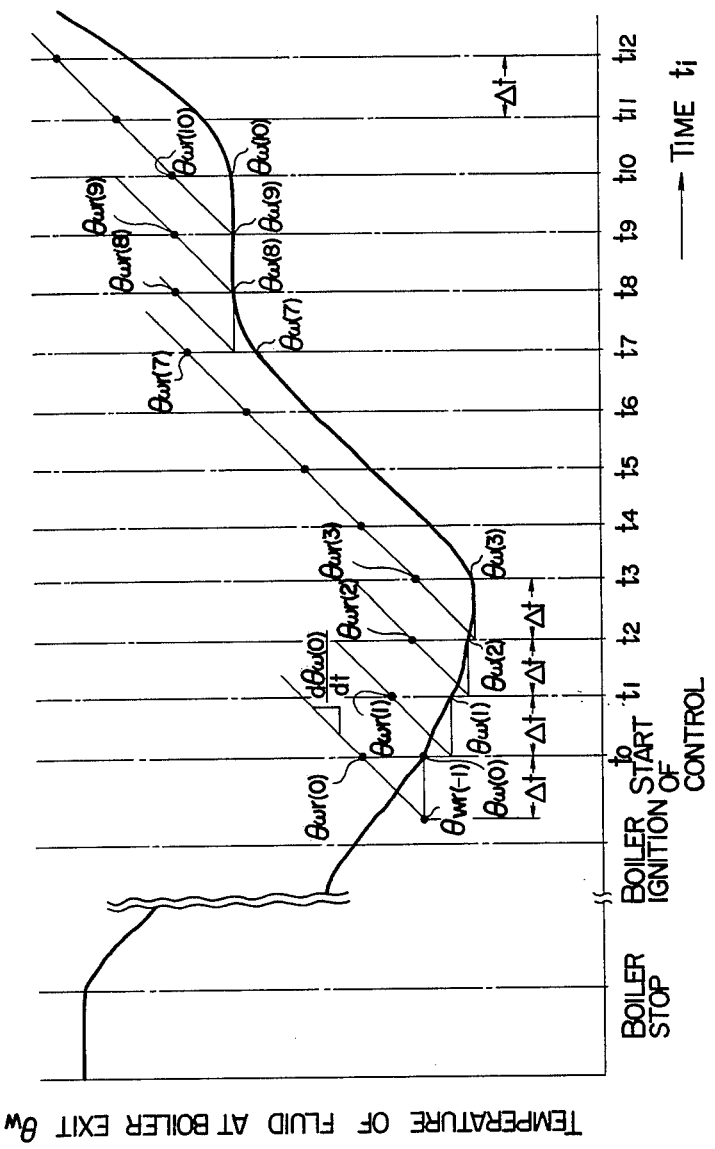

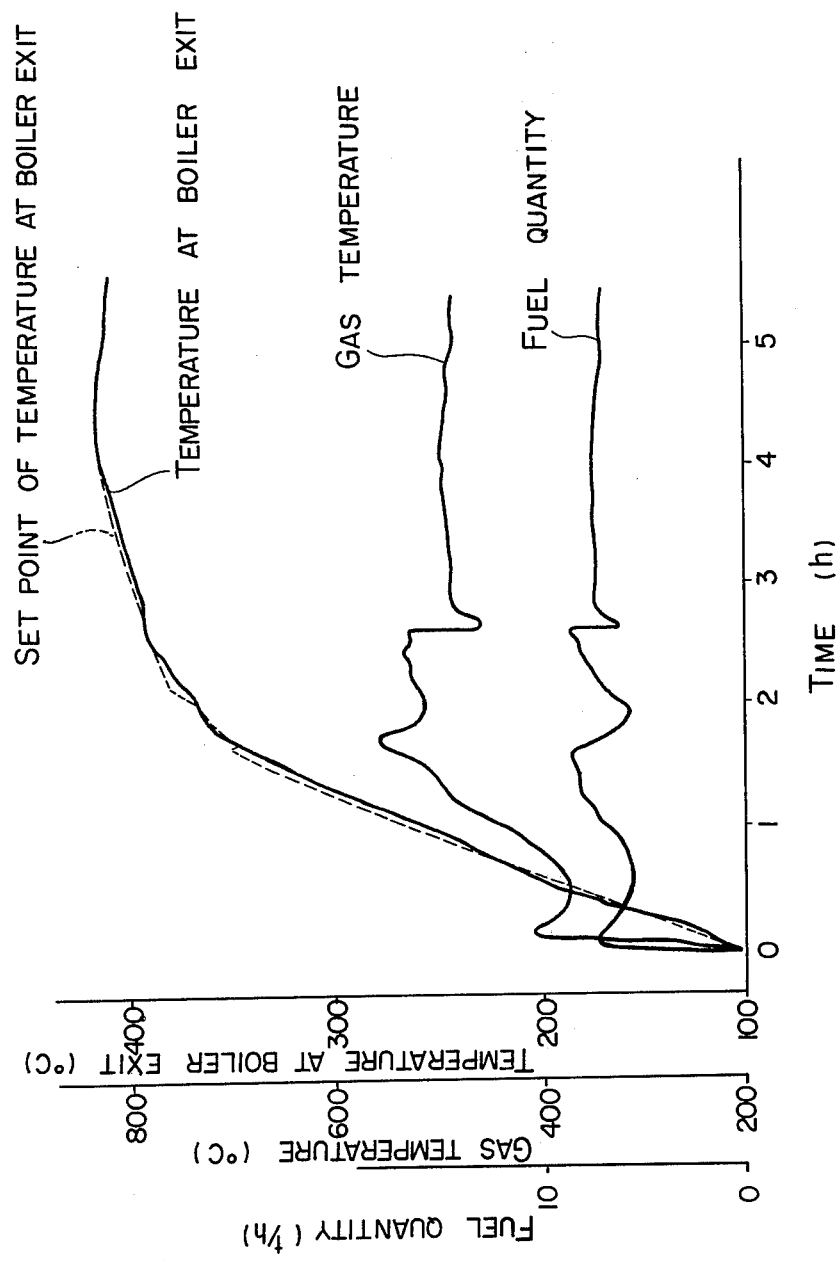

3,877,636

AUTOMATIC STARTING DEVICE FOR PLANT

BACKGROUND OF THE INVENTION

This invention relates to a starting device for presenting a given rate of temperature rise for a temperature of the exit output in such a plant which undergoes, to a large extent, changes in plant characteristics in the starting phase of heat exchange operation, and more particularly to a starting device adapted to automatically starting a boiler, by which is meant a plant in the sense used herein.

Hereinafter, description will be given, taking a boiler as a typical example of plants which carry out heat exchange.

Meant by 'starting of a boiler' as used herein is a phase of operation, in which a fluid temperature at the exit of an boiler is raised to a given temperature at a predetermined rate of temperature rise by adjusting the amount of the fuel, after igniting a burner of boiler which has been maintained in an inoperative condition. In this respect, the starting of a boiler is defined as including either cold start or hot start.

Hitherto, the starting of a boiler is carried out by a skilled operator by adjusting the amount of fuel, while monitoring exhaust gas from the exit of a boiler as well as a fluid temperature at the exit of a boiler. Particularly, skill is required for maintaining a desired rate of temperature rise of the fluid at the exit of the boiler, and a close attention should be given to the temperature of the exhaust gas from the exit of a boiler, in an attempt to prevent overheating of a super-heater or reheater, because in the starting phase of the boiler, there is little or no flow of steam through a super-heater or reheater.

Meanwhile, in the current electric power supply systems which have largely resorted to thermal power, the rapid starting of the thermal power plant is required. As a result, difficulties have been encountered, when having a recourse to a method wherein operators have to watch various kinds of meters for adjusting amount of fuel to be supplied, for the purpose of safely starting the boiler within a predetermined period of time. This in turn dictates the use of a controlling-computer or the like for achieving a highly automated system.

However, for automation for starting a boiler, there remain the following problems to be solved:

1. The time constant of the starting characteristic of a boiler is greater as compared with other characteristic such as of a turbine. For instance, with a turbine, the time constant of a turbine speed variation with respect to the variation in quantity of steam is at most 2 to 3 minutes, while with the boiler, the time constant of the fluid temperature variation at the exit of a boiler with respect to fuel amount variation is about 200 to 100 times as great as the aforesaid time constant. Accordingly, no improvement can be expected for the controlling characteristics, when resorting to so-called a feed-back control system, wherein a corrective operation is effected after the occurance of a temperature deviation.

2. The extent of variation in the starting characteristic of a boiler is greater than the characteristic variation of a turbine or the like. In terms of the time constant, variation in time constant of a turbine is 1 to 2 minutes, while the time constant of the boiler ranges from about 60 minutes to about 200 minutes. It is recognized that, in the case of a turbine, its loss characteristic is responsible for this, while in the case of a boiler, a plurality of parameters such as specific weight of internal fluid, specific heat and the like participate in this matter. It follows that, in the case of starting turbine, intended characteristics may be obtained by resorting to a system, in which control parameters are corrected by using a turbine speed as a function thereof, whereas in the case of starting a boiler, the control parameters can not be corrected by means of a single parameter.

3. Since steam is not caused to flow through a super heater and reheater during the starting phase of a boiler, the upper limit is imposed on the exhaust-gas temperature at the exit of a boiler for the purpose of protectng pipings or the like from over-heating. In case an exhaust gas temperature exceeds the aforesaid limit, then fuel amount should be controlled so as to maintain the exhaust gas temperature below a predetermined value. However, this should be such as not to adversely affect an automatic starting operation.

4. As has been described under the paragraph (1), the time constant of the fluid temperature variation at the exit of a boiler is great with respect to the variation in the fuel amount, such that the controlled amount will not smoothly vary with the variation of the target value (i.e., the desired value), with the result that the target value alone varies in accordance with a predetermined varying rate, thereby presenting a greater controlling deviation. The increase in the controlling deviation will result in the increase in the operational amount which is required for eliminating such a deviation, such that there is a danger of causing adverse effects such as overshooting or hunting, after the process controlling amount has come close to the target value.

The aforesaid description has been referred thus far to a boiler which has been taken as one example. However, such should not be construed in a limitative sense, and hence such may be applied, in general, to plants which use heat-exchangers. The aforesaid adverse effects are attributable to instable characteristics of a heat exchanger in the starting phase of operation.

SUMMARY OF THE INVENTION

It is accordingly an object of the invention to provide a device which enables an automatic starting, with accuracy, in a manner to present a given rate of temperature rise for the fluid at the exit of a plant.

It is another object of the invention to provide a device which enables safe and positive automatic starting of a plant, such as a boiler, without maintaining an exhaust gas temperature below a predetermined limit.

It is a further object of the invention to provide a device which enables the automatic starting of a plant within a short period of time.

These and other objects and features will be apparent from a reading of the ensuing part of the specification with reference to the accompanying drawings.

According to the present invention, there is provided a device which enables automatic starting of a plant using heat exchangers in a manner that the fluid temperature at the exit of a boiler is raised at a given rate of temperature rise, by adopting an estimation controlling system. More specifically, an enthalpy of a fluid at the exit of a plant at a given time may be determined by a fluid temperature at the exit of a plant, after which the enthalpy after a given lapse of time may be estimated from the variation in the enthalpy which has been thus obtained, and then the fluid temperature corresponding to the thus obtained enthalpy may be determined, whereby the estimation of the fluid temperature at the exit of the plant after a given lapse of time may be achieved. On the other hand, a target value for a fluid temperature at the exit of a plant after a given lapse of time may be obtained from a fluid temperature at the exit of the plant and from a given rate of temperature rise. Thus, the fuel amount required for a plant may be adjusted, commensurate to the deviation from the estimated value, of the thus obtained target value for the fluid temperature at the exit of plant after a given lapse of time, whereby the intended automatic starting may be achieved in a manner that the fluid temperature at the exit of a plant is raised in a predetermined rate of temperature rise.

BRIEF DESCRIPTION OF THE DRAWINGS

FIG. 7 is a plot illustrating the manner to correct a target value for a temperature at the time of sampling, commensurate to a target-value-correcting signal; and FIG. 8 is a characteristic plot showing variation in a temperature at the exit of a boiler with respect to a target value for temperature, variations in gas temperature and fuel amount, upon starting of a boiler by using the device of the invention.

DETAILED DESCRIPTION OF THE PREFERRED EMBODIMENTS

Firstly, description will be given on the constructions of a boiler and associated equipments plus the procedure for starting a boiler with reference to FIG. 1.

Figure 1:
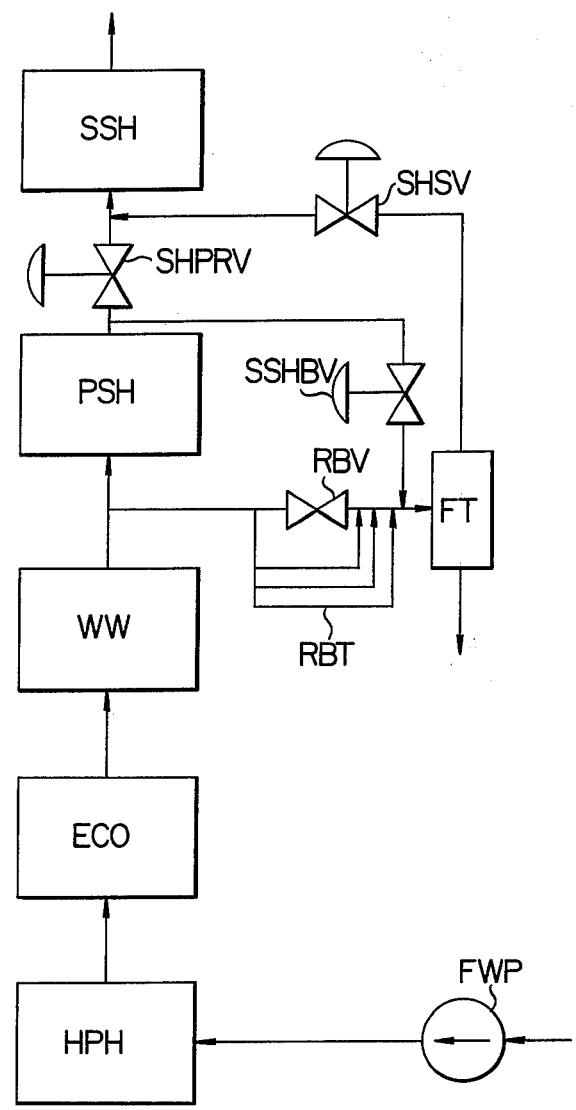
FIG. 1 is a view illustrating the construction of a conventional type boiler and associated equipments.

Referring to FIG. 1, shown at FWP is a feed water pump, at HPH is a higher pressure heater which is adapted to heat the feed water by using extracted gas from a turbine (not shown) and to feed same to the center portion of a boiler. Designated at ECO is an economizer which is adapted to heat the feed water by using exhaust gas from a boiler. Shown at WW, PSH and SSH are a water wall, a primary super-heater and a secondary super-heater, respectively. Shown at FT is a flush tank or water separator which is adapted to separate water from steam. Shown at RBT is a resistor by-pass tube. Furthermore, shown as SHSV, SHPRV and SSHBV are a super-heater stop valve, super-heater pressure reducing valve and a secondary super-heater by-pass valve, respectively.

As is well known in such a thermal power plant, the starting procedure of a boiler is followed, with strict limitations imposed on the rate of temperature rise at the exit of a boiler and a gas temperature at the exit of a boiler:

1. Firstly, with valve SHPRV and valve SHSV being fully closed, the water feed pump FWP is started to feed water to the high pressure heater HPH, economizer ECO, water wall WW and the primary super-heater PSH to fill same with water. Then, the fluid pressure at the exit of the primary super-heater PSH is raised to a rated pressure.
2. Then, the boiler is ignited for raising a temperature. In this case, the internal fluid running through the high pressure heater HPH to the flush tank FT is maintained in water state, and accordingly, steam is not present in the secondary super-heater SSH. As a result, the temperature rise of a boiler is controlled in such a manner that the fluid temperature at the exit of the boiler may be raised at a given rate of temperature rise by adjusting amount of fuel being fed.
3. As the temperature of a boiler is raised in this manner, there will be generated steam in the flush tank FT, with the resultant increase in the internal pressure therein.
4. When the internal pressure in the flush tank reaches a predetermined pressure, the super-heater stop valve will be opened and thus steam will be introduced into the secondary super-heater SSH and a turbine (not shown) to warm the turbine.
5. Upon completion of warming of the turbine, the super-heater pressure reducing valve will be opened to raise the main steam pressure to a rated value.
6. When the main steam pressure reaches a rated value and the main steam temperature is raised to a rated temperature, then the boiler starting phase will be completed and shifted to a normal operation. In passing, in case a boiler is cold-started, it takes about 10 hours from the beginning until the boiler is brought into a normal operation and then an automatic boiler controller become operative. In this respect, however, the boiler side remains separated from the turbine side (not shown) by means of the super heater pressure reducing valve SHPRV and the super-heater stop valve SHSV, until internal pressure in the flush tank reaches a given pressure. In conditions which have been described above, meant by a fluid temperature at the exit of the boiler is the temperature at the exit side of the water wall WW. From this time on, however, meant by the fluid temperature at the exit of the boiler when starting the secondary super-heater SSH, with the valve SHSV being open, will be so-called the main steam temperature. It should be recognized that the wordings such as a fluid temperature at the exit of a boiler, which will appear in the ensuring description, signifies the aforesaid meaning.

Figure 2:
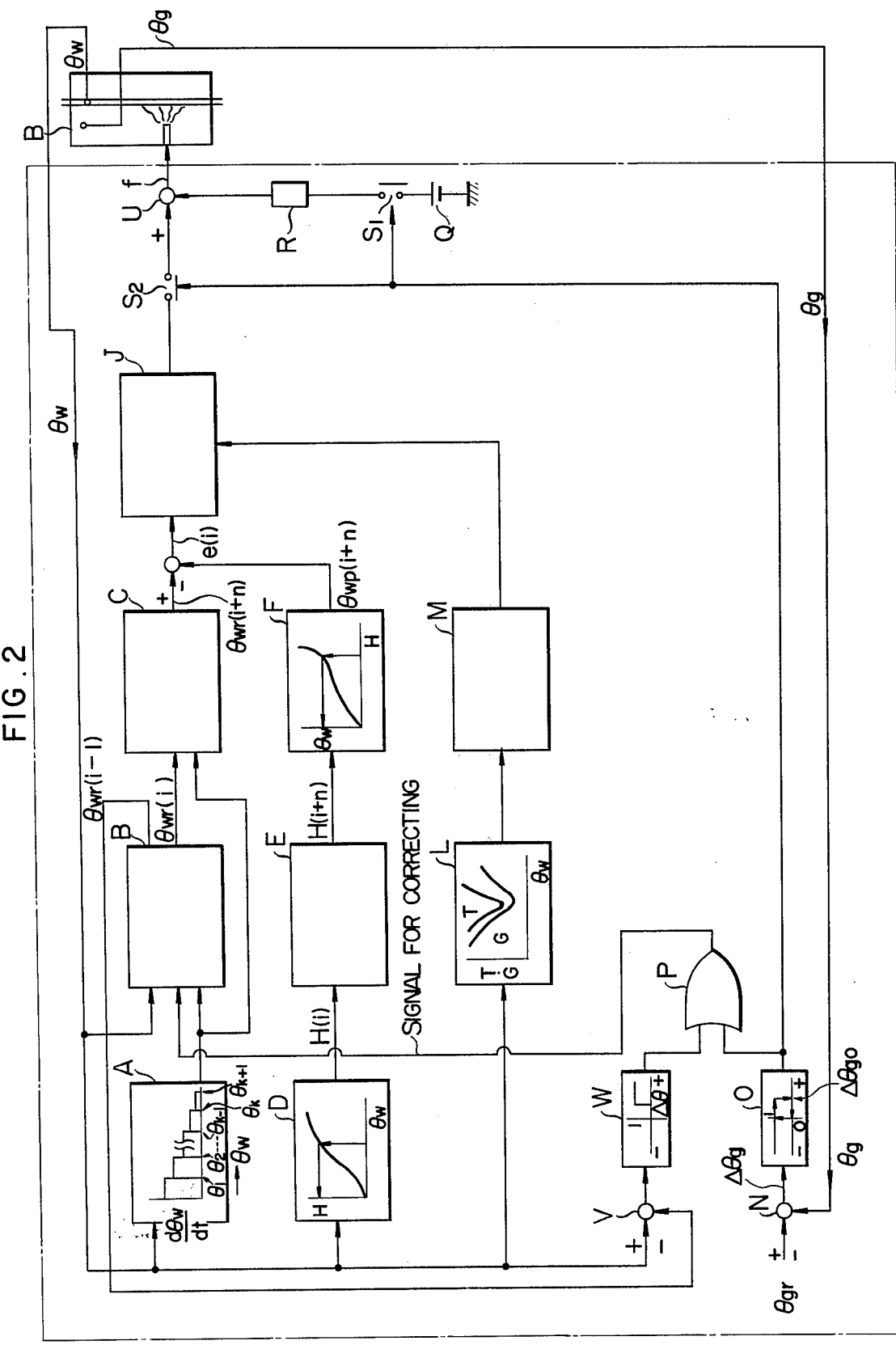
FIG. 2 is a block diagram illustrating one embodiment of the invention, of an automatic starting device for a boiler, shown separately in accordance with their functions.

FIG. 2 refers to an automatic starting device of a boiler according to the present invention, in which the fluid temperature $\theta_w$ at the exit of the boiler B and the gas temperature $\theta_g$ at the exit of the boiler are fed as inputs thereto. The fluid temperature $\theta_w$ at the exit of the boiler is so controlled as to be raised at a given rate of temperature rise $d\theta_w/dt$ by controlling a fuel amount. Meanwhile, as has been described, since the boiler characteristic, particularly the time constant, is great and the extent of the variation thereof is large, desired control may not be achieved by resorting to so-called a feed back controlling system. For this reason, according to the present invention, there is adopted an estimation control system for a fluid temperature at the exit of a boiler. In other words, the temperature $\theta w$ after a given lapse of time is determined by the fluid temperature $\theta w$ at the exit of a boiler and the rate of temperature rise $d\theta w/dt$ which has been determined beforehand corresponding to the temperature, and the temperature $\theta w$ thus determined is designated as a target value $\theta wr$. On the other hand, the temperature after the aforesaid lapse of time is estimated by the temperature $\theta w$. Then, the amount of fuel is adjusted in a manner that the deviation of the target value $\theta wr$ of the temperature $\theta w$ from the estimated value $\theta wp$ becomes null. The present invention uses an enthalpy of the fluid at the exit of the boiler for estimating the temperature $\theta w$.

Now, description will be given on the operation of the device of the invention. Meanwhile, the circuit as shown in FIG. 2 may be practical according to a digital analogue system. However, the following description will refer to the use of a controlling computer, and the circuit will be operated analogously.

Firstly, when the boiler operations as has been described with reference to FIG. 1 has been completed, the boiler is ignited. Simultaneously with the ignition of the boiler, the fluid temperature $\theta w$ at the exit of the boiler, which is required for the starting of the boiler, is fed to the boiler starting device (the portion encompassed with a one-point chain line). Then, when the control starting signal is issued by an operator, the device of the invention will be set to operation to sample the temperature $\theta w$ at a given cycle, thereby feeding same as an input. Firstly, the target value $\theta wr$ for the fluid temperature $\theta w$ at the exit of the boiler is determined. In a block A, the variation rate $d\theta w/dt$ (i.e., the target rate of temperature rise for the temperature $\theta w$) is predetermined for the fluid temperature $\theta w$ at the exit of the boiler, and the block A feeds at output therefrom to a block B and a block C. As will be described hereinafter, the block B determines the target temperature $\theta wr$ at the time of sampling from the initial value of $\theta w$ and the output (rate of temperature rise) from the block A. In this respect, the character, such as for instance, $i$ which is shown parenthesized coupled with $\theta wr$, is defined as a temperature target value at the time of sampling. In other words, $\theta wr(i+n)$ and $\theta wr(i-1)$ represent the temperature target value $n$ sampling cycle after and that one sampling cycle before, respectively. In this respect, however, detailed description on the functions of the block is avoided, because it will be referred to hereinafter as to the problems encountered with the starting of a boiler. The block C determines the target temperature $\theta wr(i+n)$ $n$ sampling after, in accordance with the following formula, from the rate of temperature rise $d\theta w(i)/dt$ which has been determined by the block A and corresponds to $\theta w(i)$ at the time of sampling, and from the target temperature $\theta wr(i)$ at the time of sampling:

$$\theta wr(i+n) = \theta wr(i) + \frac{d\theta w(i)}{dt} \times n \quad (1)$$

Figure 3:
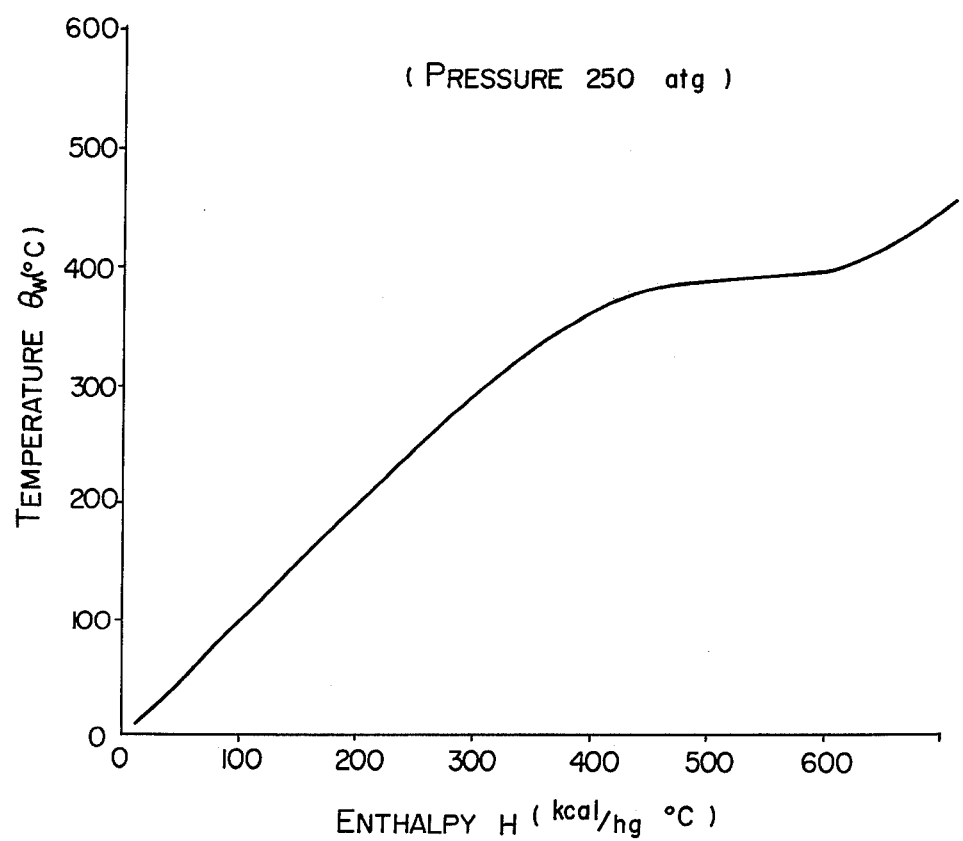
FIG. 3 is a characteristic plot illustrating the relationship of an enthalpy of the boiler to a fluid temperature at the exit of a boiler, in terms of a constant internal pressure within a boiler.
Figure 4:
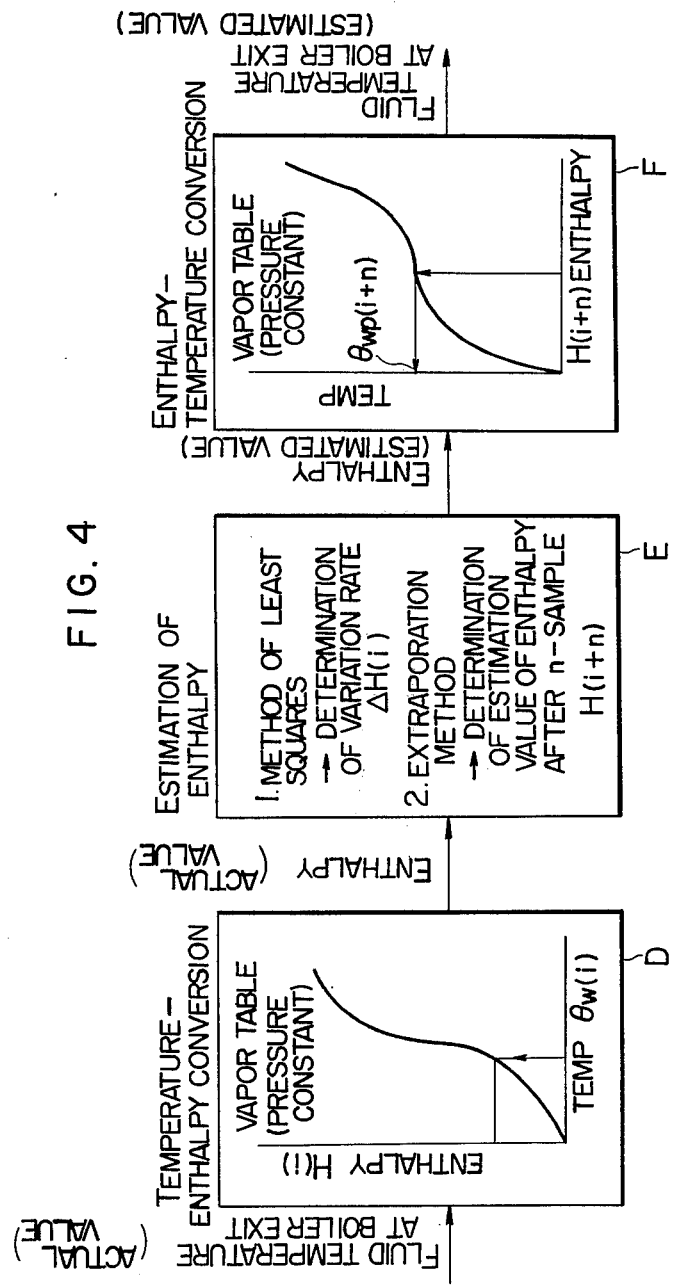
FIG. 4 is a block diagram illustrating a manner to estimate a fluid temperature at the exit of a boiler after a given lapse of time, by using the enthalpy, according to the device of the invention.

The value $\theta wr(i+n)$ shown above is used as the target value for the estimation control of the invention. On the other hand, the estimated value $\theta wp$ for the temperature $\theta w$ is determined from the blocks D, E and F. It should be noted that the use of the enthalpy for the estimation leads to the improvement in the accuracy of the device of the invention. In this respect, since a fluid pressure at the exit of the water wall is so controlled as to be constant at the time of starting of a boiler, the relationship of the temperature $\theta w$ to the enthalpy H may be determined primarily such as for instance by using a steam table and in a manner shown in FIG. 3. The blocks D, E and F estimate the fluid temperature $\theta w$ at the exit of a boiler after a given lapse of time by using the relationship shown in FIG. 3, in a manner such as in FIG. 4. The enthalpy H which corresponds to the fluid temperature $\theta w$ at the exit of a boiler is determined from the steam table of FIG. 3 at each sampling. The aforesaid fluid temperature $\theta w$ is such as has been fed as an input after sampling at a given cycle in the block D. The block E determines a variation rate of enthalpy at the respective sampling, from a plurality of enthalpy informations given at the respective sampling. The formula (2) is an example where the variation rate $\Delta H(i)$ is determined at the time of sampling by using the method of least squares.

$$\Delta H(i) = \frac{3H(i) + H(i-2) - 3H(i-3)}{10} \quad (2)$$

wherein $H(i)$ represents an enthalpy information obtained by way of a temperature-enthalpy converter, and the figure parenthesized denotes the sampling timing of the fluid temperature at the exit of the boiler. For instance, $H(i-3)$ represents an enthalpy information prior to three sampling cycles from the subject sampling timing. Formula (3) determines the enthalpy after $n$ sampling cycles according to an extrapolation technique by using the variation rate obtained in this manner.

$$H(i+n) = n \cdot \Delta H(i) + H(i) \quad (3)$$

In the block F, the temperature $\theta wp(i+n)$ corresponding to the enthalpy $H(i+n)$ after $n$ sampling cycles is obtained from the vapor table. This is the estimated value $\theta wp$ for the fluid temperature at the exit of the boiler after $n$ sampling cycles. In general, the shorter the sampling cycle and the more the date is used, the higher will be the accuracy of estimation. However, from the practical viewpoints, the sampling cycle should preferably be about one minute, and it is advantageous that the temperature after 7 minutes be estimated from four data.

The estimated value for a fluid temperature at the exit of a boiler may be determined by using a principle that the temperature and enthalpy may be primarily determined at the time of a constant pressure. The estimation of the temperature by using enthalpy presents a higher level of estimation than does the direct estimation from the temperature. In other words, the fluid temperature at the exit of a boiler may be determined as a function of the enthalpy, while it is affected not only by the specific weight but also by the specific heat, such that there will result rather nonlinear characteristic as compared with that obtained from enthalpy. Accordingly, the estimation of the temperature by using enthalpy according to the present invention presents improvement in the estimation accuracy.

The block J represents an adjusting meter for controlling the combustion rate $f$ of the boiler so as to bring the target value $\theta wr(i+n)$ for the temperature, after $n$ sampling cycles, in coincidence with the estimated value $\theta wp(i+n)$ after $n$ sampling cycles obtained in the block F. Represented by G is an adder. The control for the fuel amount $f$ may be obtained according to the following formula (4):

$$\Delta f = K_I + e(i+n) + K_p [\, e(i+n) - e(i+n-1)\,] \quad (4)$$

wherein $\Delta f$: control output (the amount of fuel $f$ is increased (+) or decreased (−) by an amount corresponding to the magnitude of a control output.)
$K_I$: integrating control gain
$K_p$: proportional control gain
$e(i+n)$: $\theta wr(i+n) - \theta wp(i+n)$
$\theta wr(i+n)$: The target value for the fluid temperature at the exit of the boiler after $n$ sampling cycles (Output from block C)
$\theta wp(i+n)$: Estimated value for the fluid temperature at the exit of a boiler after $n$ sampling cycles (see FIG. 4).

As can be seen, the present invention adopts the proportional integrating control. However, since the plant characteristic generally varies to a great extent at the time of starting of a boiler, it is hard to obtain good control characteristics throughout the starting phase of operation by using a fixed control gain.

Figure 5:
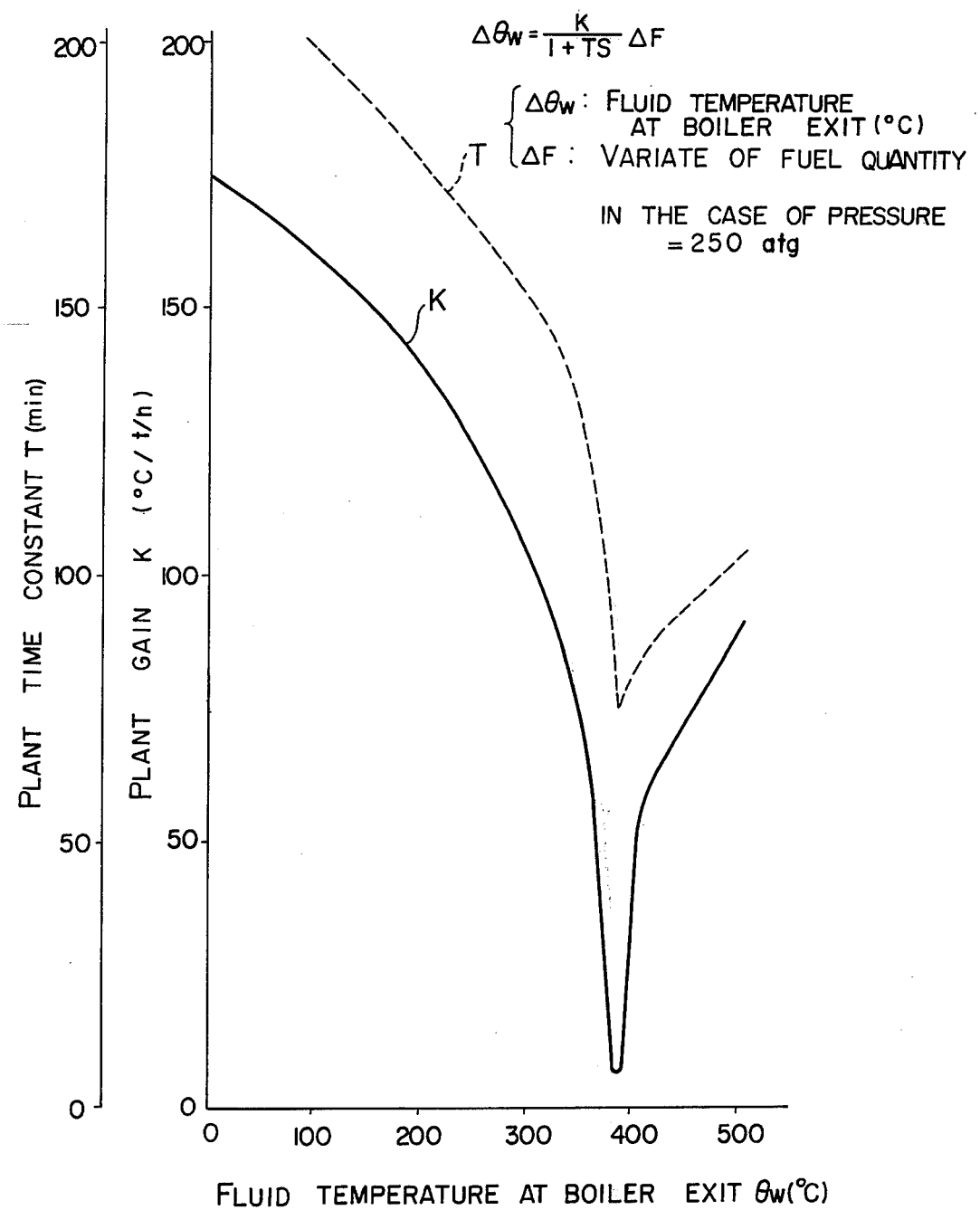
FIG. 5 is a characteristic plot illustrating a plant gain and a time constant as a function of variation in a fluid temperature at the exit of a boiler.

FIG. 5 is a plot illustrating by way of an example the variation in the time constant T of a plant versus a plant gain at the time of starting, when the plant is expressed as a first lag factor. As can be seen from this figure, the gain varies in the range from one to about 30 times, while the time constant varies in the range from 1 to about 3 times. For this reason, the characteristics of a plant, i.e., the characteristics of the variation in the fluid temperature at the exit of the boiler with respect to the variation in fuel amount $\Delta f$ is assumed in a delay circuit, and the control gain is corrected commensurate to the variation in gain and the time constant of a plant, whereby there is achieved a further improvement in the control characteristics at the starting of a plant.

For instance, by assuming the characteristics of plant as a first lag factor $K/(1 + Ts)$, the characteristic formula of the entire system at the time of starting of a plant may be obtained from the control given in the formula (4) according to the formula (5) as follows:

$$Z^2 - (P_{11} + P_{22})Z + P_{11}P_{22} - P_{12}P_{21} = 0 \quad (5)$$

wherein:

$P_{11} = e - \frac{\Delta t}{T}$ ($\Delta t$: sampling cycle)

$P_{12} = K \left( 1 - e - \frac{\Delta t}{T} \right)$ $P_{21} = K_p - (K_p + K_I) e - \frac{\Delta t}{T}$ $P_{22} = 1 - K(K_p + K_I) \left( 1 - e - \frac{\Delta t}{T} \right)$ For obtaining a response which causes the system to catch up the target value rapidly but without causing vibration in the system, assume in the formula (5) as follows: $Z_1 = 0$, $Z_2 = \beta (0 < \beta < 1)$. Then, the proportional and integrating control gains $K_p$ and $K_i$ in the formula (4) may be obtained as in the formula (6) and (7):

$$K_I = \frac{1}{K \left( e^{\frac{\Delta t}{T}} - 1 \right)} \quad (6)$$

$$K_p = \frac{1 - \beta}{K \left( 1 - e^{\frac{-\Delta t}{T}} \right)} \quad (7)$$

The control gain adjuster M corrects the boiler starting control commensurate to the fluid temperature $\theta w$ at the exit of a boiler by adjusting proportional gain $K_p$ and integrating gain $K_I$ as shown in the formula (4). For instance, by feeding as input the fluid temperature $\theta w$ at the exit of a boiler, the plant gain K and plant time constant T corresponding to $T_1$ are determined from a model L representing starting characteristic of FIG. 5. The block L controls $K_p$ and $K_I$ of the adjuster J so as to present optimum plant starting optimum by obtaining proportional gain $K_p$ and integrating gain $K_I$ by substituting K and T in the formula (6) and (7). In FIG. 5, the plant is assumed as the first lag circuit. However, for achieving better control, the high order lag circuit may be used. This however, suffers from disadvantages of the complicated characteristic formula. However, for practical use, the first lag circuit only meets the requirement, when resorting to a correcting method according to ON-Line system by using a computer.

As is apparent from the foregoing description, the present invention uses a principle that the fluid temperature at the exit of a boiler is sampled at a given cycle as an input, such that the target value $\theta wr$ for the temperature after the given lapse of time and the estimated value $\theta wp$ are determined from the temperatures $\theta w$ at the respective sampling time and thus these target values are controlled so as to coincide with each other. In this case, the accuracy of temperature estimation may be improved by using enthalpy which is of better linear configuration and corresponds to the fluid temperature, rather than the use of the temperature signal, for estimating a fluid temperature at the exit of a boiler.

The boiler starting is accomplished in the aforesaid manner. When the gas temperature at the exit of a boiler exceeds the specified value in the course of starting, it is necessary to protect pipes, through which no steam is introduced from a boiler. In the automatic starting device according to the present invention, the gas temperature $\theta g$ at the exit of a boiler is monitored at all times. Accordingly, if the gas temperature exceeds a specified value, the aforesaid estimation control will be ceased so as to suppress the gas temperature $\theta g$ below the specified value.

As shown in FIG. 2, the gas temperature $\theta g$ at the exit of a boiler is compared with the specified value $\theta gr$ at the adder N. When the comparator $\theta$ detects the gas temperature $\theta g$ which is higher than the specified value $\theta gr$, the normally opened contact $S_1$ is closed and the normally closed contact $S_2$ is opened. In other words, the output from the adjuster J the estimation control device is cut at the contact $S_2$, while the output from a given electric power source Q is fed by way of an integrator R to the adder U, thereby reducing the amount of fuel. In this respect, the polarity of electric power source Q is so selected as to reduce the fuel amount $f$ and to lower the gas temperature $\theta g$. In passing, the comparator has a hysteresis characteristic and hence prevents unwanted hunting produced in the neighborhood of $\theta gr$, when the gas temperature $\theta g$ is restored to the specified value. In other words, the comparator feeds its output only when the its input $\Delta \theta g$ becomes negative ($\theta g > \theta gr$), and it stops feeding an output, when $\Delta \theta g$ becomes a given positive value $\Delta \theta go$ ($\theta gr - \theta g \quad \Delta \theta go$). Then, the contacts $S_1$ and $S_2$ will be restored to the initial conditions, and thus the boiler starting will be set to operation by the estimation control again.

On the other hand, the device according to the present invention has a function to correct the target value $\theta wr$ of the temperature $\theta w$, when the initial starting is effected and the gas temperature at the exit of a boiler exceeds the specified value. In other words, in the initial starting phase where the control starting instruction has just been issued, even if the fuel amount $f$ is increased, $\theta w$ will not be increased immediately, and if the target value $\theta w$ is increased independently, the deviation of $\theta wr$ from $\theta wp$ will become greater, thus failing to present good control. Furthermore, if the target value $\theta wr$ is increased when the temperature $\theta g$ of the exhaust gas exceeds the specified value and hence the output from the adjuster J is stopped, the boiler will be subjected to external interference due to the deviation of the actual fuel amount $f$ from a required amount of fuel, when controlling by means of the output from the adjuster again.

Now, description will be given in detail on the operation to determine a target value $\theta wr$ by blocks A, B and C, with reference to the flow diagram. FIG. 6 shows a program representing operations of a circuit of FIG. 2. Firstly, after the ignition of a boiler, the circuit starts by means of a control starting instruction and samples a fluid temperature $\theta w(i)$ at the exit of a boiler at a given cycle and feed same as input, unless the boiler starting operation is completed. If the boiler starting operation has not been completed, the circuit will be completed in fact. If the sampling input $\theta w(i)$ is the first information $\theta w(o)$ ($\theta w$ at the time of the issue of the control starting instruction), the target value $\theta wr(o)$ at the time of sampling may be determined commensurate to the value $\theta w(o)$. As shown in FIG. 7, the detected temperature $\theta w(o)$ at the timing of starting control is assumed as being the target value $\theta wr(-1)$ of the temperature at the timing $t(-1)$ one sampling cycle before. Then, the detected temperature $\theta w(o)$ is obtained in the following formula by using the rate of temperature rise $d\theta w[\theta wr(-1)]/dt$ which has been predetermined corresponding to $\theta wr(-1) = \theta w(o)$, and by using sampling cycle $\Delta t$ and $\theta wr(-1)$:

$$\theta wr(o) = \theta wr(-1) + \frac{d\theta w[\theta wr(-1)]}{dt} \times \Delta t \qquad (8).$$

wherein $d\theta w[\theta wr(-1)]/dt$ represents a rate of temperature rise which has been set corresponding to the target value $\theta wr(-1)$ one sampling cycle before.

For the second sampling cycle and after, the target value $\theta wr(i)$ at the $i$ th timing $ti$ is determined. In this case, the target value $\theta wr(i-1)$ at the $(i-1)$th sampling cycle has been determined, and accordingly the $\theta wr(i)$ may be determined by the following formula:

$$\theta wr(i) = \theta wr(i-1) + \frac{d\theta w[\theta wr(i-1)]}{dt} \times \Delta t \qquad (9).$$

wherein the rate of temperature rise $d\theta w[\theta wr(i)]/dt$ varies due to a fluid temperature at the exit of a boiler. Thus, if the temperature when the rate of temperature rise varies, ($\theta_1, \theta_2 \ldots \theta_{k-1}, \theta_k, \theta_{k+1} \ldots$, which are generally shown as $\theta_k$) is present between $\theta wr(i-1)$ and $\theta wr(i)$, then $\theta wr(i)$ will be corrected for obtaining an accurate target value. Whether or not $\theta_k$ is present between $\theta wr(i-1)$ and $\theta wr(i)$ may be determined by $\theta wr(i-1) < \theta_k < \theta wr(i)$. If $\theta_k$ is present, $\theta wr(i)$ is corrected by the following formula (10) and (11):

$$t_k = \frac{\theta_k - \theta wr(i-1)}{\theta wr(i) - \theta wr(i-1)} \Delta t \qquad (10).$$

$$\theta wr(i) = \theta_k + \frac{d\theta w[\theta wr(i)]}{dt} \times (\Delta t - t_k) \qquad (11).$$

wherein $t_k$ is a time duration between the timing of the temperature which is equal to $\theta_k$ and the timing of sampling $t_{i-1}$. The obtained target value $\theta wr(i)$ at an arbitrary sampling timing is corrected by the target value correcting signal of FIG. 2, as required. The target value correcting signal is issued, as has been described earlier, when the target value deviates to a large extent from the actually measured temperature or when the gas temperature becomes abnormal.

Referring to the former phenomenon, this tends to take place at the initial phase of starting operation. This is because the increase of the fuel at the starting time does not lead to immediate rise in temperature. As shown in FIG. 2, the deviation of the temperature target value $\theta wr(i-1)$ one sampling cycle before from the actually measured value $\theta w(i)$ at the present sampling timing is obtained by the adder V, while the comparator detects the deviation which is over $\Delta \theta$. For instance, at the sampling timing $t_1$ in FIG. 7, $\theta w(1)$ is compared with $\theta wr(o)$. If $\theta wr(i-1) - \theta w(i) \quad \Delta \theta$, the target value $\theta wr(i)$ is corrected. This correction is made in the same manner as when the target value $\theta wr(o)$ is obtained from $\theta w(o)$ at the time of starting control. More particularly, the temperature $\theta w(i)$ at the present sampling timing is assumed as being the target value $\theta wr(i-1)$ one sampling cycle before, and $\theta wr(i)$ is obtained by the following formula:

$$\theta wr(i) = \theta wr(i-1) + \frac{d\theta w[\theta wr(i-1)]}{dt} \times \Delta t \qquad (12).$$

Referring now to the latter case wherein the gas temperature becomes abnormal, it is generally admitted as being abnormal, when $\theta g$ exceeds 540°C. In the case of the gas temperature being abnormal, the abnormality is stored (FE = 1), the target value $\theta wr(i)$ is corrected in the manner as shown in formula (12). (The description on this is omitted to avoid the duplication.) On the other hand, the fuel amount is reduced by $\Delta f$. Then, it is kept in stand-by condition, until the next sampling input is fed in. The reduction in the fuel amount is maintained, until $\theta g$ becomes for instance below 530°C.

When below 530°C, the memory of the gas temperature which is abnormal is released (FE 32 0). The sampling timings $t7$, $t8$ and $t9$ are the target values $\theta wr(i)$ which have been corrected due to the abnormal gas temperature. The release of the gas temperature abnormality at 530°C is considered as being equivalent to the comparator $\theta$ of FIG. 2 which has a hysteresis characteristic.

Subsequently, the target value $\theta wr(i+n)n$ sampling cycles after is obtained from the target value $\theta wr(i)$ at the present sampling timing. $\theta wr(i)$ is obtained from $\theta wr(i+n)$ in the same manner as $\theta wr(i)$ has been obtained from $\theta wr(i-1)$ by the formula (9), (10) and (11).

Firstly, $\theta wr(i+n)$ is obtained.

$$\theta wr(i+n) = \theta wr(i) + \frac{d\theta w[\theta wr(i)]}{dt} \times n\Delta t \quad (13).$$

If the temperature $\theta_k$, at which the rate of temperature rise is varied is present between $\theta wr(i)$ and $\theta wr(i+n)$, then $\theta wr(i+n)$ is corrected, with the proviso that only one $\theta_k$ exists between $\theta wr(i)$ and $\theta wr(i+n)$.

$$t_k = \frac{\theta_k - \theta wr(i)}{\theta wr(i+n) - \theta wr(i)} \times n\Delta t \quad (14)$$

$$\theta wr(i+n) = \theta_k + \frac{d\theta w[\theta wr(i+n)]}{dt} \times (n\Delta t - t_k) \quad (15).$$

Figure 6A:
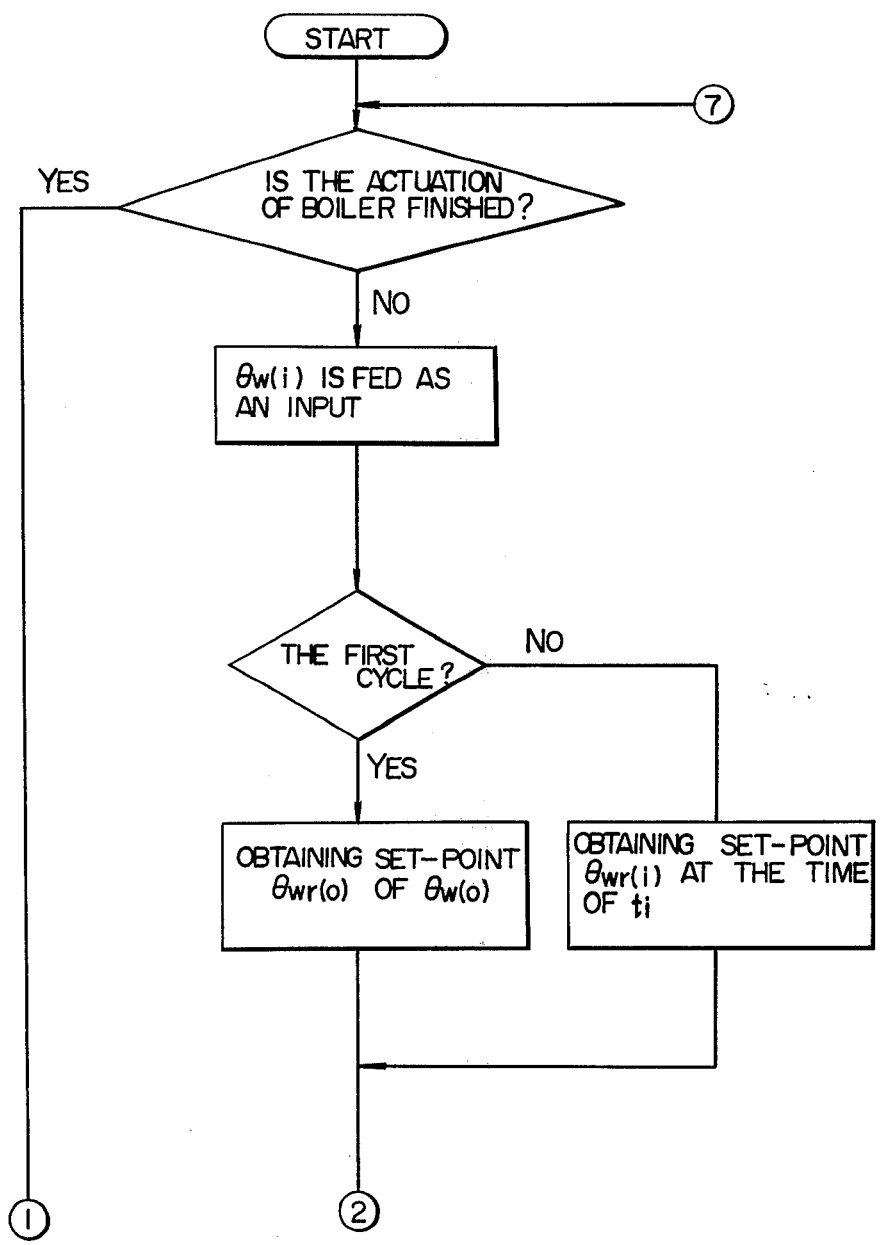
FIG. 6 is a flow chart showing a program for practicing the device of the invention as shown in FIG. 2 by using a controlling computer.
Figure 6B:
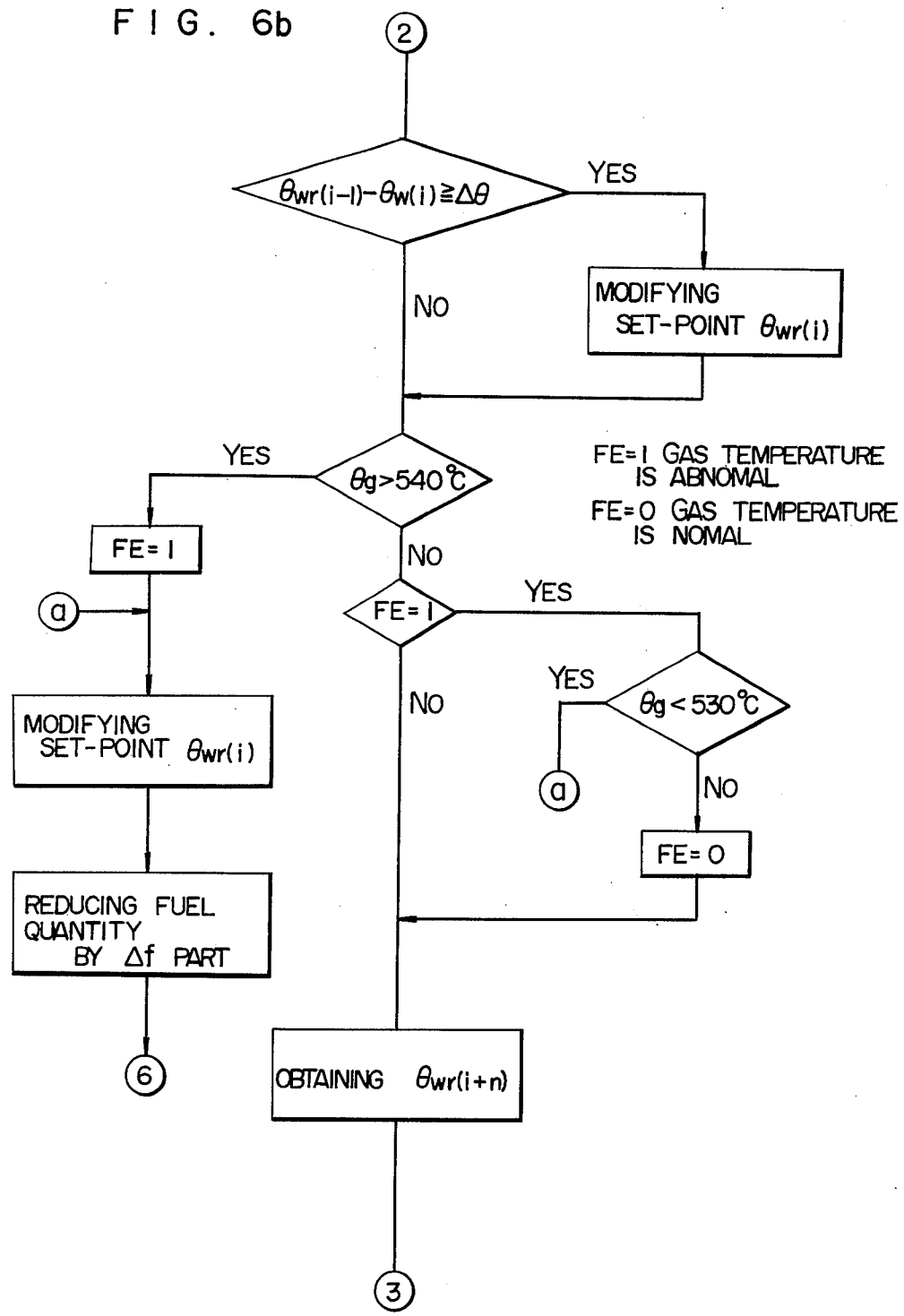
Figure 6C:
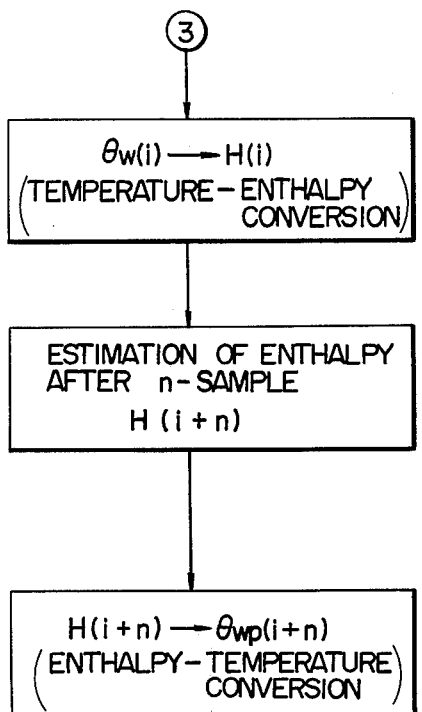
Figure 6D:
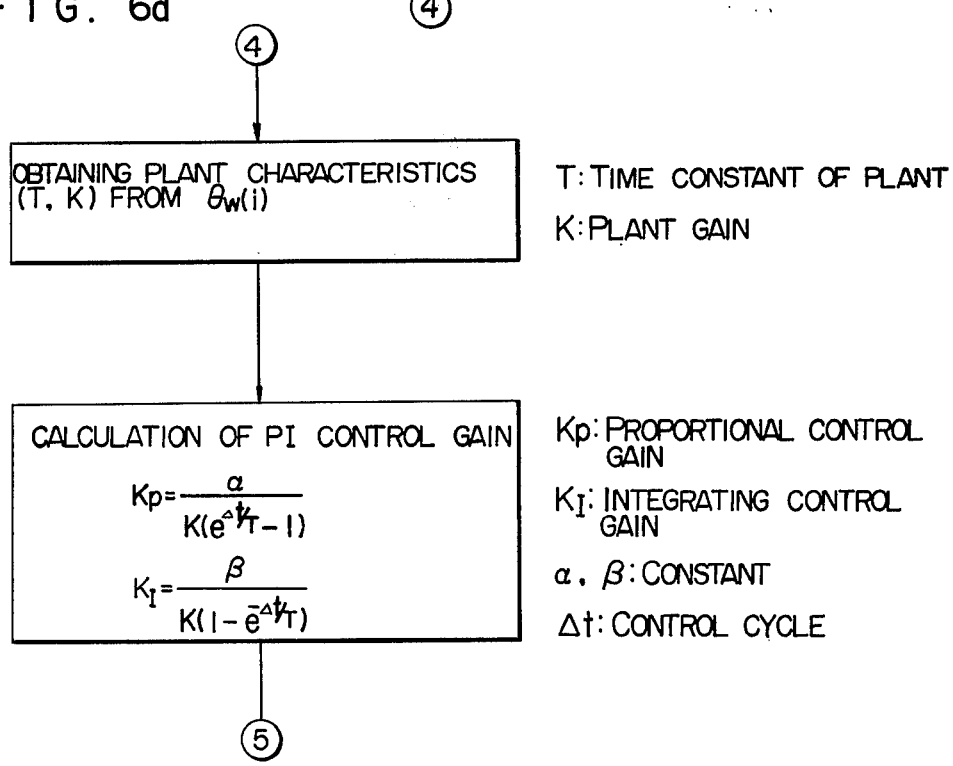
Figure 6E:
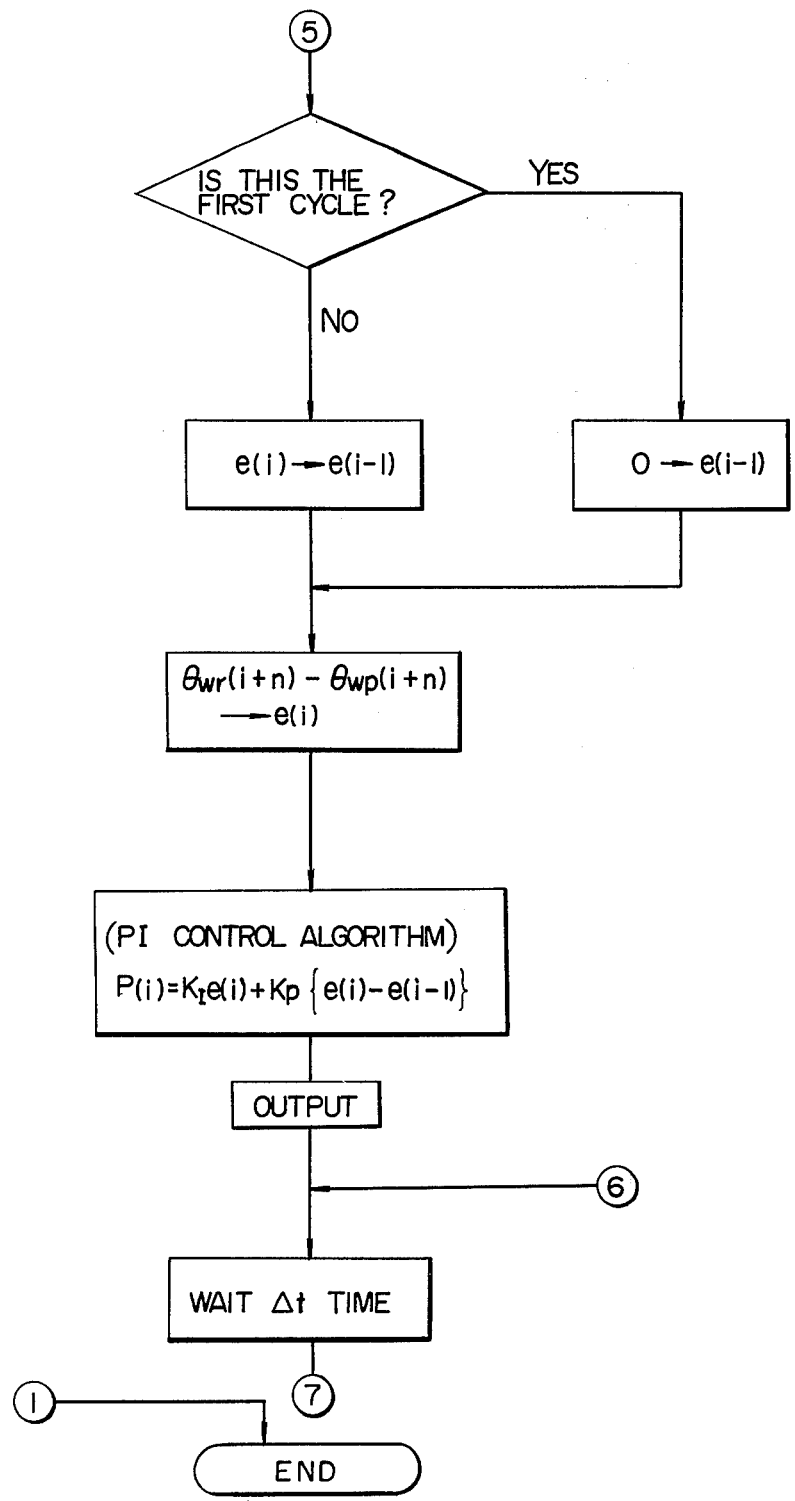

In this manner, the target value $\theta wr(i+n)$ after $n$ sampling cycle, for the fluid temperature at the exit of a boiler may be obtained. Although the flow chart illustrates all the operations of the circuit of FIG. 2, description is limited to the determination of the target value, because the other description is well covered under the description given on FIG. 2. Meanwhile, $e(i)$ as shown in FIG. 6(a) represents the deviation of the target value $\theta wr(i+n)$ from the estimated value $\theta wp(i+n)$. P ($i$) is calculated, assuming that the deviation one sampling timing before is zero at the time of starting control (the first sampling).

FIG. 8 is a plot illustrating the control characteristic of a fluid temperature at the exit of a boiler according to the present invention. As can be seen from this figure, the maximum deviation of the temperature is maintained within about 10°C in the course of the boiler starting operation, thus presenting a good and stable control.

As is apparent from the foregoing description on the present invention, the fluid temperature at the exit of a boiler is introduced by sampling, and then the temperature target value and the estimated value is obtained from the temperature at the respective sampling timing, followed by the control of these two values so as to bring those in coincidence with each other. In this respect, the accuracy of the temperature estimation is improved due to the use of enthalpy having a relatively good linear configuration whi.˙ enthalpy corresponds to the fluid temperature, rather than due to the use of a temperature signal, for estimation of a fluid temperature at the exit of a boiler. According to another aspect of the invention, the primary delay circuit serves to approximate the boiler, and then the gain of the proportional integrating control, the time constant and the like are adjusted to an optimum conditions, thereby presenting a proportional integrating control corresponding to boiler characteristics, such as gain, time constant and the like at the time of starting boiler. This improves the accuracy at the time of starting boiler.

While the description has been given with reference to block diagrams having a respective function, DDC (Direct Digital Control) using a controlling computer may be used in its place. This also enables ready automatic starting of a boiler. Meanwhile, the present invention has been described with reference to the first order lag circuit. However, for achieving a higher level of starting accuracy, $n$ th order delay circuit may be used, despite the complicated calculation for obtaining gain and time constant.

In addition to this, at the timing of instructing the control starting, the fluid temperature $\theta w$ at the exit of a boiler alone is fed as an input, regardless of whether or not it is hot-start or cold start. Furthermore, the manual operation may be smoothly switched to automatic operation.

I claim:

1. A plant automatic starting device, which has means for controlling a fluid pressure at the exit of a plant so as to be maintained constant and a heat change function, characterized in that said device comprises:
   a temperature deriving means for sampling a fluid temperature at the exit of the plant at a given cycle and feeding same as an input;
   means for estimating the fluid temperature at the exit of the plant $n$ sampling cycles after, by using an enthalpy which is possessed by the fluid pressure at the exit of the plant and corresponds to the output at the time of present sampling;
   means for setting a given rate of temperature rise for the fluid temperature at the exit of the plant;
   means for obtaining a target temperature of the fluid at the exit of the plant $n$ sampling cycles after, from the rate of temperature rise and the initial value of the target value of the fluid temperature at the exit of the plant; and
   an adjusting means for controlling the total heat to be fed to the plant, commensurate to the deviation of the target temperatures from the estimated temperatures of the aforesaid means.

2. A plant automatic starting device as set forth in claim 1, wherein means for estimating temperature, $n$ sampling cycles after consists of means for obtaining an enthalpy which is possessed by the fluid at the exit of the plant, and corresponds to the fluid temperature at the exit of the plant; means for obtaining, by estimation, the enthalpy $n$ sampling cycles after, from the variation rate of the enthalpy and the magnitude thereof; and means for obtaining the fluid temperature at the exit of the plant which corresponds to the enthalpy estimated.

3. A boiler starting device which as means for controlling a fluid pressure at the exit of a boiler so as to be maintained constant at the starting time of the boiler, characterized in that said device comprises:
   a temperature deriving means for sampling the fluid temperature at the exit of the boiler at a given cycle and then feeding same as an input;
   a first means for estimating the fluid temperature at the exit of the boiler $n$ sampling cycles after, by using enthalpy which is possessed by the fluid pressure at the exit of the boiler and corresponds to the output at the time of the present sampling;

a second means for setting a given rate of temperature rise for the fluid temperature at the exit of the boiler;

a third means for obtaining the target temperature of the fluid at the exit of the boiler $n$ sampling cycles after, from the given rate of temperature rise and the initial value of the target value of the fluid temperature at the exit of the boiler; and an adjusting means for controlling the fuel amount to be fed to the boiler commensurate to the deviation of the output of the first means from that of the third means.

4. A boiler starting device as set forth in claim 3, wherein said first means consists of means for obtaining enthalpy which is possessed by the fluid at the exit of the boiler and corresponds to the fluid temperature at the exit of the boiler; means for obtaining, by estimation, the enthalpy $n$ sampling cycles after, from the variation rate of the enthalpy and the magnitude thereof; and means for obtaining the fluid temperature at the exit of the boiler which corresponds to the enthalpy estimated.

5. A boiler starting device as set forth in claim 4, wherein when the deviation of the information obtained from the initial value of the target value for the fluid temperature at the exit of the boiler of the second means from the information obtained by way of temperature detecting means, is greater than the specified value, the initial value of the target value of the fluid temperature at the exit of the boiler is corrected, based on the information obtained by way of the temperature detecting means.

6. A boiler starting device as set forth in claim 5, wherein the initial value of the target value for the fluid temperature at the exit of the boiler is corrected even if the temperature of exhaust gas at the exit of the boiler exceeds the specified value.

7. A boiler starting device as set forth in claim 6, wherein when the boiler exhaust gas temperature exceeds the specified value, the amount of the fuel to be fed to the boiler is reduced.

8. A boiler starting device as set forth in claim 3, wherein said device is provided with a delay element representing the boiler characteristic and wherein control characteristic of the adjusting means may be varied, commensurate to the variation in plant characteristic which corresponds to the output from the temperature deriving means.

9. A boiler starting device as set forth in claim 4, wherein said device is provided with a delay element representing the boiler characteristic and wherein control characteristic of the adjusting means may be varied, commensurate to the variation in plant characteristic which corresponds to the output from the temperature deriving means.

10. A boiler starting device as set forth in claim 5, wherein said device is provided with a delay element representing the boiler characteristic and wherein control characteristic of the adjusting means may be varied, commensurate to the variation in plant characteristic which corresponds to the output of the temperature detecting means.

11. A boiler starting device as set forth in claim 6, wherein said device is provided with a delay element representing the boiler characteristic and wherein control characteristic of the adjusting means may be varied, commensurate to the variation in plant characteristic which corresponds to the output from the temperature detecting means.

12. A boiler starting device as set forth in claim 7, wherein said device is provided with a delay element representing the boiler characteristic and wherein control characteristic of the adjusting means may be varied, commensurate to the variation in plant characteristic which corresponds to the output from the temperature detecting means.

* * * * *